United States Patent
Kruegel et al.

(10) Patent No.: US 10,333,935 B2
(45) Date of Patent: *Jun. 25, 2019

(54) METHOD AND MANAGEMENT SERVER FOR REVOKING GROUP SERVER IDENTIFIERS OF COMPROMISED GROUP SERVERS

(71) Applicant: MOTOROLA SOLUTIONS, INC., Schaumburg, IL (US)

(72) Inventors: Chris A. Kruegel, Plainfield, IL (US); Michael F. Korus, Eden Prairie, MN (US); Katrin Reitsma, Chicago, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 352 days.

This patent is subject to a terminal disclaimer.

(21) Appl. No.: 15/174,816

(22) Filed: Jun. 6, 2016

(65) Prior Publication Data

US 2017/0353455 A1 Dec. 7, 2017

(51) Int. Cl.
*H04L 9/08* (2006.01)
*H04L 29/06* (2006.01)
(Continued)

(52) U.S. Cl.
CPC ............ *H04L 63/10* (2013.01); *H04L 9/0833* (2013.01); *H04L 9/0847* (2013.01);
(Continued)

(58) Field of Classification Search
CPC ......... H04L 63/10; H04L 9/0833; H04L 9/32; H04L 51/26; H04L 63/065; H04L 63/08;
(Continued)

(56) References Cited

U.S. PATENT DOCUMENTS

| 6,782,103 B1 | 8/2004 | Arthan et al. |
| RE43,934 E | 1/2013 | Smith |

(Continued)

FOREIGN PATENT DOCUMENTS

| EP | 1109351 | 6/2001 |
| JP | 2011523513 | 8/2011 |

(Continued)

OTHER PUBLICATIONS

Office Action from the US Patent and Trademark Office for U.S. Appl. No. 15/174,424 dated Feb. 22, 2018 (14 pages).

(Continued)

*Primary Examiner* — Oleg Korsak
(74) *Attorney, Agent, or Firm* — Michael Best & Friedrich LLP (57) ABSTRACT

Method and management server for revoking group server identifiers of compromised group servers. One method includes determining, with a management server, an identity-based cryptographic signing key based on a group server identifier. The method also includes distributing, via the management server, the identity-based cryptographic signing key to a group server. The method further includes receiving, at the management server, a security status indicating that the security of the group server is compromised. The method also includes, responsive to receiving the security status, distributing, via the management server, a revocation of the group server identifier to a plurality of communication devices.

20 Claims, 4 Drawing Sheets

(51) Int. Cl.
  *H04W 4/90* (2018.01)
  *H04L 9/32* (2006.01)
  *H04L 12/58* (2006.01)
  *H04W 4/10* (2009.01)
  *H04L 29/08* (2006.01)
  *H04W 4/08* (2009.01)
  *H04W 12/12* (2009.01)

(52) U.S. Cl.
  CPC .............. *H04L 9/0891* (2013.01); *H04L 9/32* (2013.01); *H04L 51/26* (2013.01); *H04L 63/065* (2013.01); *H04L 63/08* (2013.01); *H04L 63/14* (2013.01); *H04L 63/145* (2013.01); *H04L 65/1063* (2013.01); *H04L 65/4061* (2013.01); *H04L 65/602* (2013.01); *H04L 67/1044* (2013.01); *H04W 4/08* (2013.01); *H04W 4/10* (2013.01); *H04W 4/90* (2018.02); *H04W 12/12* (2013.01)

(58) Field of Classification Search
  CPC ...... H04L 63/14; H04L 65/1063; H04W 4/90; H04W 4/10
  See application file for complete search history.

(56) References Cited

U.S. PATENT DOCUMENTS

| | | | |
|---|---|---|---|
| 8,458,462 | B1 | 6/2013 | Hanna |
| 9,300,473 | B2 | 3/2016 | Nix |
| 2003/0126433 | A1 | 7/2003 | Hui |
| 2004/0111636 | A1* | 6/2004 | Baffes .................. G06F 21/554 726/23 |
| 2006/0093150 | A1 | 5/2006 | Reddy et al. |
| 2008/0162589 | A1 | 7/2008 | Rodeheffer et al. |
| 2008/0232595 | A1 | 9/2008 | Pietrowicz et al. |
| 2010/0014677 | A1 | 1/2010 | Sato et al. |
| 2010/0153713 | A1 | 6/2010 | Klein |
| 2010/0329463 | A1 | 12/2010 | Ratliff et al. |
| 2013/0073860 | A1 | 3/2013 | Ibraimi et al. |
| 2013/0124870 | A1 | 5/2013 | Rosati et al. |
| 2014/0095883 | A1 | 4/2014 | Kirillov et al. |
| 2016/0034693 | A1 | 2/2016 | Takeuchi |
| 2017/0353308 | A1 | 12/2017 | Reitsma et al. |
| 2017/0353438 | A1 | 12/2017 | Reitsma et al. |

FOREIGN PATENT DOCUMENTS

| | | |
|---|---|---|
| WO | 2004032416 | 4/2004 |
| WO | 2008115988 | 9/2008 |
| WO | 2009017984 | 2/2009 |
| WO | 2010033353 | 3/2010 |

OTHER PUBLICATIONS

Office Action from the US Patent and Trademark Office for U.S. Appl. No. 15/174,762 dated Mar. 9, 2018 (9 pages).
GB1708181.9 Search Report dated Oct. 29, 2017 (5 pages).
Groves, "Elliptic Curve-Based Certificateless Signatures for Identity-Based Encryption (ECCSI)," memo RFC 6507, Feb. 2012, pp. 1-17, ISSN:2070-1721.
Groves, "Sakai-Kasahara Key Encryption (SAKKE)," memo RFC 6508, Feb. 2012, pp. 1-21, ISSN:2070-1721.
Groves, "Mikey-Sakke: Sakai-Kasahara Key Encryption in Multimedia Internet KEYing (MIKEY)," memo RFC 6509, Feb. 2012, pp. 1-21, ISSN:2070-1721.
3GPP TS 33.179, 3rd Generation Partnership Project; Technical Specification Group Services and System Aspects; Security of Mission Critical Push to Talk (MCPTT), technical specification, Mar. 2016, pp. 1-77, V1.1.0.
3GPP TS 33.303, "3rd Generation Partnership Project; Technical Specification Group Services and System Aspects; Proximity-based Services (ProSe); Security aspects," technical specification, Mar. 2016, pp. 1-88, V13.3.0.
3GPP TR 33.879, "3rd Generation Partnership Project;Technical Specification Group Services and System Aspects; Study on security enhancements for Mission Critical Push to Talk (MCPTT) over LTE," technical specification, Mar. 2016, pp. 1-86, V13.0.0.
3GPP TS 33.179, 3rd Generation Partnership Project; Technical Specification Group Services and System Aspects; Security of Mission Critical Push to Talk (MCPTT), technical specification, Feb. 2016, Release 13, pp. 1-77, V2.0.0.
PCT/US2017/032507 International Search Report and Written Opinion of the International Searching Authority dated Jul. 11, 2017 (17 pages).
GB1708218.1 Combined Search and Examination Report dated Oct. 27, 2017 (7 pages).
Office Action from the US Patent and Trademark Office for U.S. Appl. No. 15/174,762 dated Jul. 23, 2018 (8 pages).
Office Action from the US Patent and Trademark Office for U.S. Appl. No. 15/174,424 dated Aug. 6, 2018 (10 pages).
Office Action from the US Patent and Trademark Office for U.S. Appl. No. 15/174,424 dated Feb. 21, 2019 (11 pages).

* cited by examiner

METHOD AND MANAGEMENT SERVER FOR REVOKING GROUP SERVER IDENTIFIERS OF COMPROMISED GROUP SERVERS

BACKGROUND OF THE INVENTION

The 3rd Generation Partnership Project (3GPP) is standardizing Sakai-Kasahara Key Encryption in Multimedia Internet KEYing (MIKEY-SAKKE) for communication devices that communicate in accordance with the 33.179 Security of Mission Critical Push-To-Talk (MCPTT) specification. MIKEY-SAKKE and other key management schemes often rely on periodic key renewal to enhance security. However, many conventional key management schemes do not include mechanisms for handling security compromised group servers. As a result, in such situations, communication devices that receive group keys from security compromised group servers cannot securely communicate with each other using group communication.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One embodiment provides a method of revoking group server identifiers of compromised group servers. In one example, the method includes determining, with a management server, an identity-based cryptographic signing key based on a group server identifier. The method also includes distributing, via the management server, the identity-based cryptographic signing key to a group server. The method further includes receiving, at the management server, a security status indicating that the security of the group server is compromised. The method also includes, responsive to receiving the security status, distributing, via the management server, a revocation of the group server identifier to a plurality of communication devices.

Another embodiment provides a management server. In one example, the management server includes a transceiver and an electronic processor. The electronic processor is electrically coupled to the transceiver. The electronic processor is configured to determine an identity-based cryptographic signing key based on a group server identifier. The electronic processor is also configured to distribute, via the transceiver, the identity-based cryptographic signing key to a group server. The electronic processor is further configured to receive, via the transceiver, a security status indicating that security of the group server is compromised. Responsive to receiving the security status, the electronic processor is also configured to distribute, via the transceiver, a revocation of the group server identifier to a plurality of communication devices.

Figure 1:
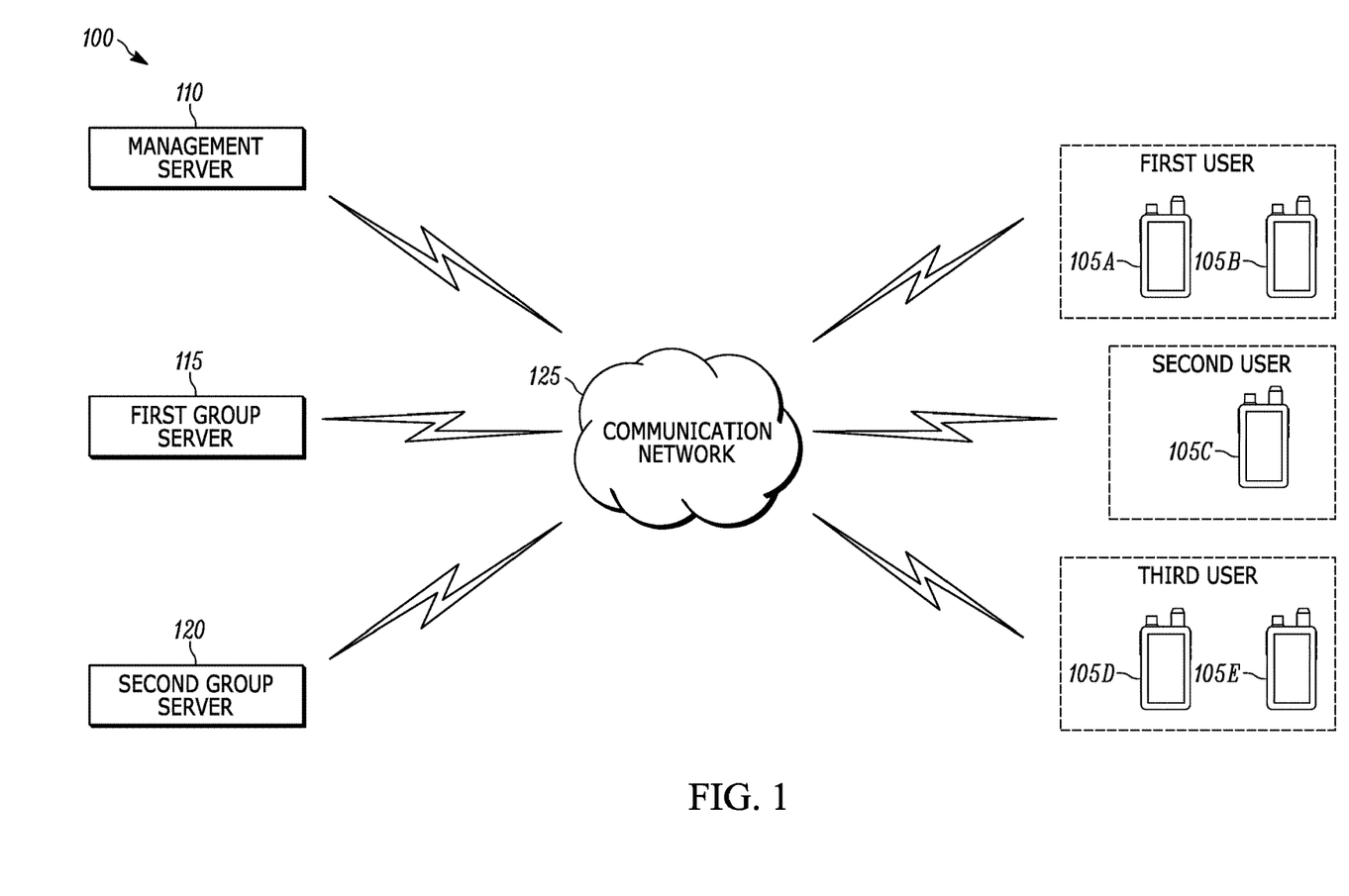
FIG. 1 is a diagram of a communication system in accordance with some embodiments.

FIG. 1 is a diagram of a communication system 100 according to one embodiment. The communication system 100 includes communication devices 105A through 105E, a management server 110, a first group server 115, and a second group server 120. The communication devices 105A through 105E, the management server 110, the first group server 115, and the second group server 120, communicate over a communication network 125. In some embodiments, the communication network 125 operates according to the Public Safety Long Term Evolution (LTE) communication protocol. In alternate embodiments, the communication network 125 operates using one or more other wireless or wired communication protocols including, but not limited to, Terrestrial Trunked Radio (TETRA), Digital Mobile Radio (DMR), Project 25 (P25), 5G, Wi-Fi, Bluetooth®, cable, Ethernet, and satellite. The communication system 100 illustrated in FIG. 1 is provided as one example of such a system. The methods described herein may be used with communication systems with fewer, additional, or different components in different configurations than the communication system 100 illustrated in FIG. 1. For example, in some embodiments, the communication system 100 includes fewer or additional group servers and may include fewer or additional communication devices.

The communication devices 105A through 105E may be devices capable of communicating over the communication network 125. As illustrated in FIG. 1, the communication devices 105A through 105E may be handheld or portable devices, such as smart telephones, portable radios, and tablets. In some embodiments, the communication devices 105A through 105E are portable, two-way radios designed to be carried by public safety personnel, such as police officers.

Each of the communication devices 105A through 105E illustrated in FIG. 1 is associated with a user. Multiple communication devices may be temporarily or permanently associated with a single user. As an example, communication devices 105A and 105B may be associated with a first user, communication devices 105C may be associated with a second user, and communication devices 105D and 105E may be associated with a third user.

A unique group server identifier is associated with each group server. The group server identifier may include a uniform resource identifier (URI) (for example, GroupManagerID@example.org). An identity-based cryptographic signing key is also associated with each group server. The identity-based cryptographic signing key is determined based in part on the group server identifier. As used herein, the term "key," may refer to a single key, a plurality of keys, a single key pair, a plurality of key pairs, or a combination thereof.

The first, second, and third users are members of at least one talk group (for example, a first talk group). As used herein, the term "talk group," may refer to a virtual radio channel (for example, a frequency channel) that is used for communication between a group of communication devices. A group key is associated with each talk group. In some embodiments, the group key includes a symmetric group key. The group key is common across all communication devices of users that are members of a talk group. The group key enables secure group communication between the communication devices of users that are members of the talk group. Communication devices receive group keys from group servers. As an example, the management server 110 determines a first identity-based cryptographic signing key based in part on a first group server identifier of the first group server 115. The first group server 115 distributes a first group key to the communication devices 105A through 105E. The first group server 115 digitally signs the first group key with the first identity-based cryptographic signing key. The communication devices 105A through 105E authenticate the first group key using at least the first group server identifier (for example, as described in the 33.179 Security of Mission Critical Push-To-Talk (MCPTT) specification).

Figure 2:
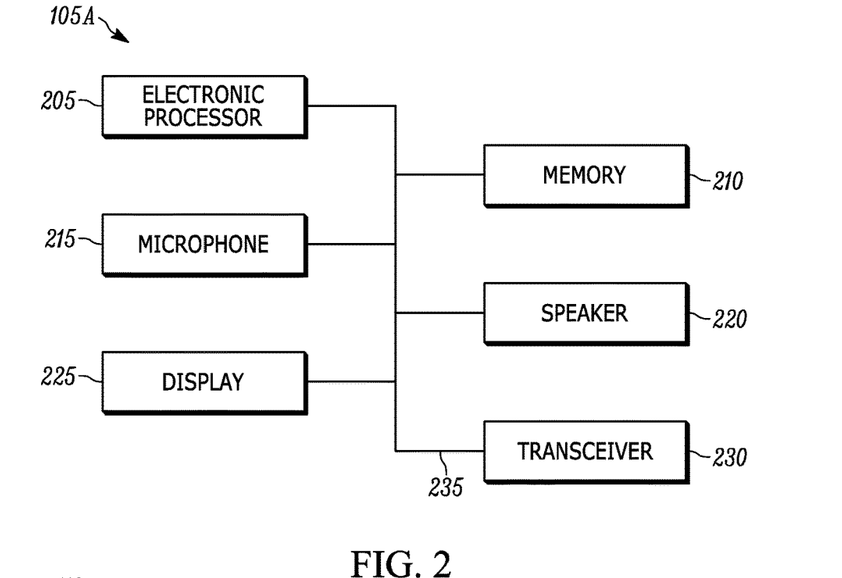
FIG. 2 is a diagram of a communication device included in the communication system of FIG. 1 in accordance with some embodiments.

FIG. 2 is a diagram of communication device 105A according to one embodiment. As illustrated in FIG. 2, communication device 105A may include an electronic processor 205, memory 210, a microphone 215, a speaker 220, a display 225, and a transceiver 230. The electronic processor 205, the memory 210, the microphone 215, the speaker 220, the display 225, and the transceiver 230 are connected to each other through one or more conductors or links such as a bus 235. In alternate embodiments, the communication device 105A may include fewer or additional components in configurations different from the configuration illustrated in FIG. 2.

In some embodiments, the electronic processor 205 includes a primary electronic processor and a secondary electronic processor (for example, a separate secure electronic processor, a subscriber identification module (SIM) card electronic processor, a trusted platform module (TPM), and the like). The memory 210 stores instructions and data. The memory 210 may include combinations of different types of memory, such as read only memory (ROM), random access memory (RAM), and other non-transitory memory. The electronic processor 205 retrieves instructions from the memory 210 and executes the instructions to perform a set of functions including all or part of the methods described herein.

The microphone 215 detects sound and outputs analogous electric signals representing the sound to the electronic processor 205. The speaker 220 receives electric signals from the electronic processor 205 and outputs sound.

The display 225 provides a visual output (for example, graphical indicators, lights, colors, text, images, combinations of the foregoing, and the like) regarding a status of communication device 105A. The display 225 includes a suitable display mechanism for displaying the visual output (for example, a light-emitting diode (LED) screen, a liquid crystal display (LCD) screen, or the like).

The transceiver 230 transmits signals to the communication network 125 and receives signals from the communication network 125. Signals may include, for example, audio data, security statuses, and data packets. In some embodiments, the transceiver 230 includes a separate transmitter and receiver.

In some embodiments, the communication devices 105B through 105E may include components or combinations of different components, including all or some of the various components described above with respect to communication device 105A.

Figure 3A:
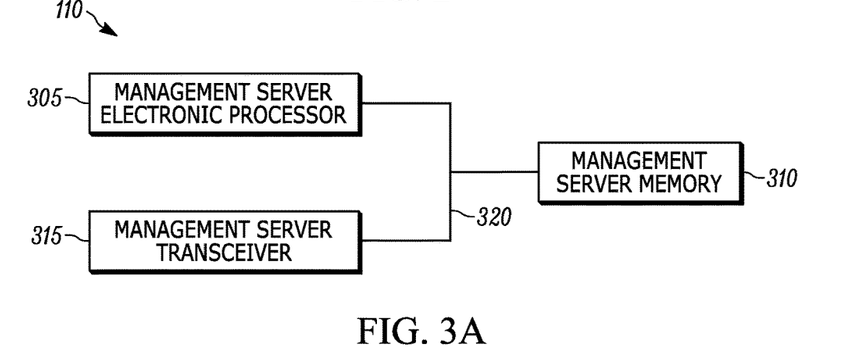
FIG. 3A is a diagram of a management server included in the communication system of FIG. 1 in accordance with some embodiments.

FIG. 3A is a diagram of the management server 110 according to one embodiment. In the example illustrated, the management server 110 may include a management server electronic processor 305, management server memory 310, and a management server transceiver 315. The management server electronic processor 305, the management server memory 310, and the management server transceiver 315 communicate through one or more conductors or links 320. In other embodiments, the management server 110 may include fewer or additional components in configurations different from that illustrated in FIG. 3A. In some embodiments, the management server 110 is a key management server. In alternate embodiments, the management server 110 is a network management server. In alternate embodiments, the management server 110 is both a key management server and a network management server.

The management server memory 310 stores instructions and data. The management server memory 310 may include combinations of different types of memory, including the various types of memory described above with respect to the memory 210. The management server electronic processor 305 retrieves instructions from the management server memory 310 and executes the instructions to perform a set of functions including all or part of the methods described herein. The management server transceiver 315 transmits signals to and receives signals from the communication devices 105A through 105E, such as through the communication network 125 or directly. Signals may include, for example, audio data, identity-based cryptographic signing keys, group server identifiers, security requests, security statuses, and data packets.

Figure 3B:
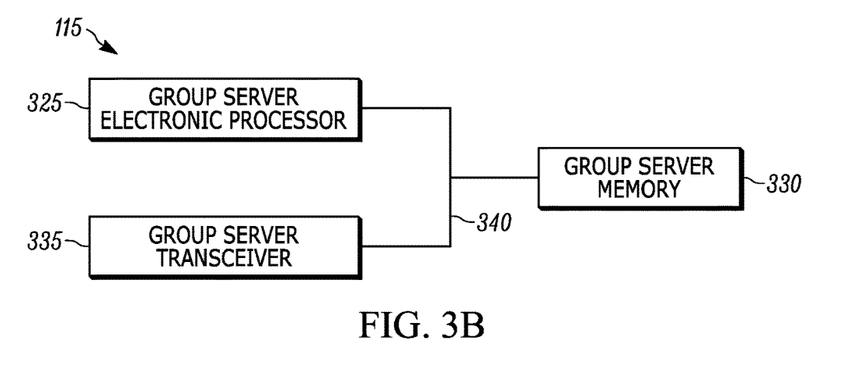
FIG. 3B is a diagram of a group server included in the communication system of FIG. 1 in accordance with some embodiments.

FIG. 3B is a diagram of the first group server 115 according to one embodiment. In the example illustrated, the first group server 115 may include a group server electronic processor 325, group server memory 330, and a group server transceiver 335. The group server electronic processor 325, the group server memory 330, and the group server transceiver 335 communicate through one or more conductors or links 340. In other embodiments, the first group server 115 may include fewer or additional components in configurations different from that illustrated in FIG. 3B. In some embodiments, the first group server 115 is a group management server.

The group server memory 330 stores instructions and data. The group server memory 330 may include combinations of different types of memory, including the various types of memory described above with respect to the management server memory 310. The group server electronic processor 325 retrieves instructions from the group server memory 330 and executes the instructions to perform a set of functions including all or part of the methods described herein. The group server transceiver 335 transmits signals to and receives signals from the communication devices 105A through 105E, such as through the communication network 125 or directly. Signals may include, for example, audio data, group keys, security requests, security statuses, and data packets.

In some embodiments, the second group server 120 may include components or combinations of different components, including all or some of the various components described above with respect to the first group server 115. In some embodiments, the second group server 120 is group management server.

There are many ways in which the security of a group server may become compromised. In general, a group server is compromised when it contains malware, restrictions have been removed to allow access to low-level functions or processes, unauthorized users access the group server (for example, via an open communication port), the integrity of protected files or file partitions have been compromised, or key-tampering is detected. A compromised group server is obviously affected by a security breach. However, communication devices may also be affected. As an example, a compromised group server may compromise the security of communication devices that receive group keys from the compromised group server.

The first group server 115 determines when its security is compromised and reports it to the management server 110. For example, in some embodiments, the first group server 115, or more particularly, the group server electronic processor 325 executing instructions, may perform the method 400 illustrated in FIG. 4 to determine and report when the security of the first group server 115 is compromised. The method 400 is described in terms of the communication system 100 illustrated in FIG. 1 to provide one example. The method 400 may be applied to other communication systems and is not limited to the communication system 100 illustrated in FIG. 1.

Figure 4:
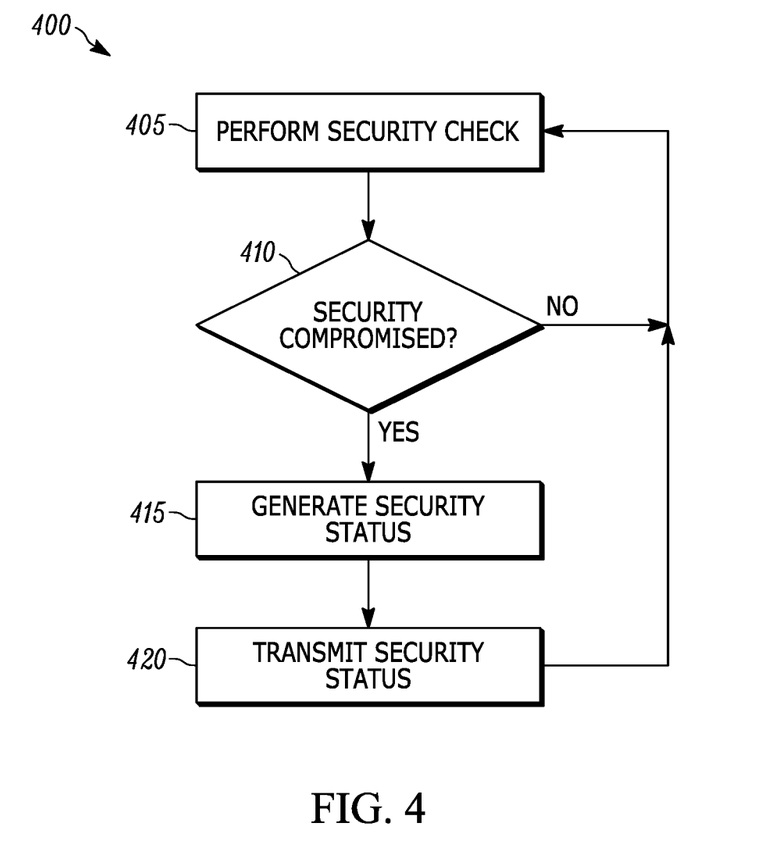
FIG. 4 is a flowchart of a method of determining and reporting when the security of a group server is compromised in accordance with some embodiments.

In the example illustrated, the method 400 includes the first group server 115 performing a security check (at block 405). In some embodiments, the first group server 115 determines when a process runs on the first group server 115 at a privilege level higher than a defined level. In other embodiments, the first group server 115 determines when a system image on the first group server 115 has been altered. Generally, the system image on the first group server 115 should be read-only. If the system image is not read-only (for example, writable), the security of the first group server 115 may be compromised. In other embodiments, the first group server 115 determines when a protected file or file partitions (for example, read-only) on the first group server 115 has been altered. In other embodiments, the first group server 115 determines when any of the keys from the first group server 115 (for example, the identity-based cryptographic signing key) have been extracted or tampered with.

After performing the security check, the first group server 115 determines when the security of the first group server 115 is compromised (at block 410). In some embodiments, the first group server 115 determines that its security has been compromised when any of the above described conditions are detected during security checks. As an example, the first group server 115 determines that its security is compromised when unauthorized users or processes run at a privilege level higher than a defined level, when malware is detected, or when key-tampering is detected.

Upon determining that its security is compromised, the first group server 115 generates a security status (at block 415) using the group server electronic processor 325. The security status may include, for example, a group server identifier, a server status, a time stamp, or a combination thereof. The server status indicates when the security of the group server is compromised. In some embodiments, the server status may include information about how the security of the group server is compromised. The time stamp may provide authentication of a genuine security status.

After generating the security status, the first group server 115 transmits the security status to the management server 110, for example, via the group server transceiver 335 (at block 420). In some embodiments, the first group server 115 establishes a secure connection to the management server 110 over which the security status is sent. For example, the first group server 115 may establish a direct connection with the management server 110 and transmit the security status over the direct connection, instead of over the communication network 125.

In some embodiments, as illustrated in FIG. 4, the first group server 115 performs another security check when its security is not compromised. In some embodiments, the first group server 115 performs the security check periodically. As an example, the first group server 115 may perform scheduled security checks once an hour, once a day, or once a week. In some embodiments, the first group server 115 may perform an unscheduled security check in response to an event. As an example, the first group server 115 may perform the security check in response to a security request which the first group server 115 receives, for example, from the management server 110. As further examples, the first group server 115 may perform a security check after installing a new application, receiving a patch, rebooting the first group server 115, a set number of failed login attempts, being disconnected from the network, and logging or monitoring a security event (for example, by a firewall, an intrusion detection system (IDS), or a security and event management (SIEM) system).

In some embodiments, the first group server 115 may generate and transmit the security status to the management server 110 even when the security of the first group server 115 is not compromised (not shown).

In some embodiments, the security status is cryptographically protected to provide authentication and integrity protection such that the security status cannot be altered on the first group server 115 (for example, by malware) or en route while being sent to the management server 110. For example, in some embodiments, the first group server 115 digitally signs the security status after it is generated in block 415. In such embodiments, the digital signature is transmitted to the management server 110 with the security status.

The management server 110 performs key management functions to ensure that the communication devices 105A through 105E do not use or accept group keys from compromised group servers. Key management schemes without explicit key revocation (for example, using certificate revocation lists) may use implicit key revocation such as periodic key renewal. With periodic key renewal, scheduled updates are performed for each of the identity-based cryptographic signing keys and the group keys. As an example, in some embodiments, the scheduled updates occur once a month. In some embodiments, the scheduled updates of identity-based cryptographic signing keys and group keys occur at the same time. In alternate embodiments, the scheduled updates of identity-based cryptographic signing keys and group keys occur at different times. As an example, scheduled updates of identity-based cryptographic signing keys may be performed on the first day of every month and scheduled updates of group keys may be performed on the fifth day of every month.

In some embodiments, each group server identifier includes at least one additional component to facilitate scheduled updates. As an example, each group server identifier may include a date suffix (for example, GroupMangerID@example.org?P-Year=2016&P-Month=03). The date suffix may be changed during each scheduled update. As an example, a date suffix of P-Year=2016&P-Month=3 may be changed to P-Year=2016&P-Month=4 during a scheduled updated. As described above, each identity-based cryptographic signing key is determined based on a group server identifier. Thus, the management server 110 determines a new identity-based cryptographic signing key when a group server identifier is updated.

In some embodiments, the management server 110 may determine when the security of the first group server 115 is compromised during a scheduled update. However, the first group server 115 may become compromised a long time before a scheduled update. During this time, group communication between communication devices using a group key issued by the first group server 115 may be unsecure. Accordingly, in some embodiments, the first group server 115 periodically determines when it is compromised to more efficiently address the issue.

Upon determining that the security of the first group server 115 has been compromised, the management server 110 revokes the current group server identifier of the first group server 115. For example, in some embodiments, the management server 110, or more particularly, the management server electronic processor 305 executing instructions, may perform the method 500 illustrated in FIG. 5 to revoke group server identifiers of compromised group servers. The method 500 is described in terms of the communication system 100 illustrated in FIG. 1 to provide one example. The method 500 may be applied to other communication systems and is not limited to the communication system 100 illustrated in FIG. 1.

Figure 5:
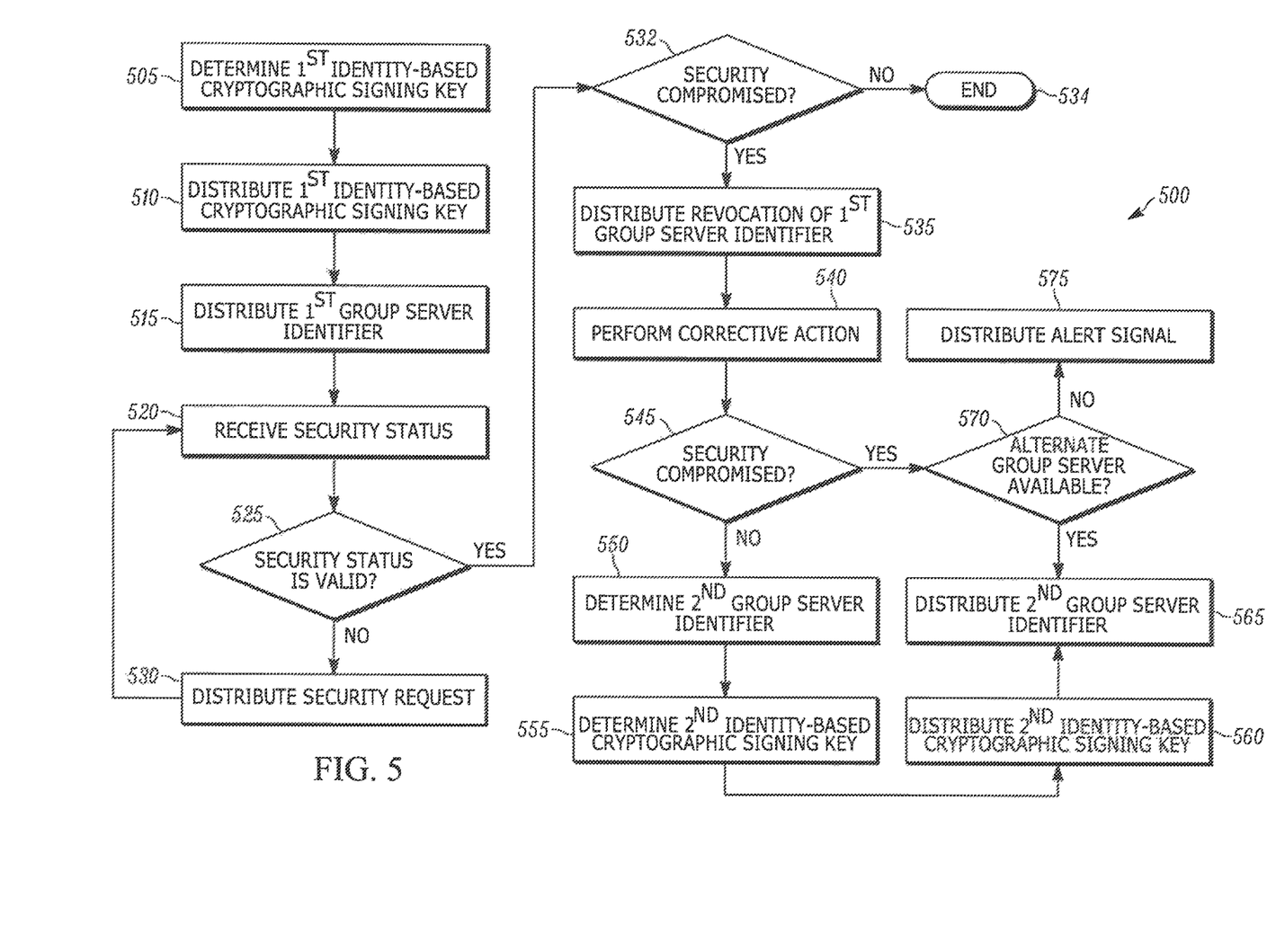
FIG. 5 is a flowchart of a method of revoking group server identifiers in accordance with some embodiments.

In the example illustrated, the method 500 includes the management server 110 determining a first identity-based cryptographic signing key based on a first group server identifier (at block 505). The management server 110 distributes the first identity-based cryptographic signing key to the first group server 115 (at block 510). The management server 110 also distributes the first group server identifier to the communication devices 105A through 105E (at block 515). As explained above, communication devices 105A through 105E are members of a talk group. The first group server 115 digitally signs group keys with the first identity-based cryptographic signing key and distributes the group keys to the communication devices 105A through 105E. The communication devices 105A through 105E authenticate group keys from the first group server 115 using at least the first group server identifier. In some embodiments, the management server 110 distributes the first group server identifier to one or more other group servers. As an example, the management server 110 may distribute the first group server identifier to the second group server 120.

Returning the FIG. 5, the management server 110 receives a security status from the first group server 115 indicating that the security of the first group server 115 is compromised (at block 520). Upon receiving the security status, the management server 110 determines when the security status is valid (at block 525). As explained above, the first group server 115 may digitally sign the security status. Thus, in some embodiments, the management server 110 verifies the authenticity and integrity of the security status based on a digital signature that is transmitted with the security status.

Also, as explained above, the security status may include a time stamp. In some embodiments, the management server 110 verifies the authenticity and integrity of the security status based at least in part on the time stamp.

In some embodiments, as in the example illustrated, the management server 110 distributes a security request to the first group server 115 when the security status is not valid (at block 530). In some embodiments, the management server 110 performs a corrective action, as described below, when the security status is not valid. As an example, the management server 110 may perform the corrective action when multiple invalid security statuses are received from the same group server over a defined period of time. In some embodiments, there is max number of attempts that the management server 110 will make to receive a valid security status from the same group server. In such embodiments, the management server 110 may determine that the security of the group server is compromised when the management server 110 is unable to receive a valid security status from the group server after the max number of attempts.

Upon verifying the validity of the security status, the management server 110 determines when the security of the first group server 105 is compromised based on the security status (at block 532). As described above, the security status indicates when the security of the first group server 105 is compromised. When the security of the first group server 105 is not compromised, the method 500 may end (at block 534).

Alternatively, when the security of the first group server 105 is compromised, the management server 110 distributes a revocation of the first group server identifier to the communication devices 105A through 105E (at block 535). As explained above, the communication devices 105A through 105E authenticate the group keys from the first group server 115 using at least the first group server identifier. Thus, upon receiving the revocation of a group server identifier, a communication device adds the revoked group server identifier to a revocation list. As an example, the management server 110 distributes a revocation of the first group server identifier to the communication devices 105A through 105E because they all received group keys from a group server that has been compromised. Upon receiving the revocation, the communication devices 105A through 105E add the first group server identifier to their revocation lists.

In some embodiments, the revocation includes a revocation effective time which indicates when the revocation of the first group server identifier took effect. In some embodiments, upon receiving the revocation, the communication devices 105A through 105E flag, stop using, or erase any group keys that they have received from the first group server 115 after the revocation effective time. In alternate embodiments, upon receiving the revocation, the communication devices 105A though 105E flag, stop using, or erase all group keys that they have received from the first group server 115.

In some embodiments, the management server 110 distributes the revocation of the first group server identifier to all communication devices that could receive keys from the first group server 115, even though their users may be members of different sets of talk groups. As an example, the management server 110 may distribute the revocation of the first group server identifier to all communication devices of users that may join at least one of the talk groups which the first group server 115 has distributed group keys for. In some embodiments, the management server 110 distributes the revocation of the first group server identifier to one or more other group servers. As an example, the management server 110 may distribute the revocation of the first group server identifier to the second group server 120.

Returning to FIG. 5, after distributing the revocation, the management server 110 performs one or more corrective actions on the first group server 115 to address the compromised security (at block 540). Corrective actions may include, for example, resetting or rebooting a compromised group server and uninstalling an unwanted programs on a compromised group server (for example, malware).

After performing the corrective action, the management server 110 determines whether the security of the first group server 115 is still compromised (at block 545). As an example, the management server 110 may distribute a security request to the first group server 115 and determine when the security of the first group server 115 is still compromised based on a second security status which the management server 110 receives from the first group server 115.

When the security of the first group server 115 is no longer compromised, the management server 110 determines an updated group server identifier (for example, a second group server identifier) of the first group server 115 (at block 550). As explained above, group server identifiers may include a uniform resource identifier and a date suffix (for example, GroupMangerID@example.org?P-Year=2016&P-Month=03). Group server identifiers may also include additional components. As an example, in some embodiments, group server identifiers include a version number (for example, GroupMangerID@example.org?P-Year=2016&P-Month=03&P-version=00). The version number may be changed (for example, incremented or decremented) each time a group server identifier is updated outside of a scheduled (for example, monthly) update. As an example, the management server 110 may determine the second group server identifier by changing the version number of the first group server identifier. In some embodiments, during a scheduled update, the date suffix may be changed and the version number may be reset to a default value (for example, zero).

Returning to FIG. 5, the management server 110 determines an updated identity-based cryptographic signing key (for example, a second identity-based cryptographic signing key) based on the second group server identifier (at block 555). The management server 110 distributes the second identity-based cryptographic signing key to the first group server 115 (at block 560). The management server 110 also distributes the second group server identifier to the communication devices 105A through 105E (at block 565).

Returning to block 545, when the security of the first group server 115 is still compromised after the corrective action is performed (for example, when the first group server 115 cannot be fixed), the management server 110 determines when an alternate group server is available (for example, the second group server 120) (at block 570). In the illustrated embodiment, when the second group server 120 is available, the management server 110 distributes a group server identifier that is associated with the second group server 120 (for example, the second group server identifier) (at block 565). In some embodiments, the second group server 120 is active prior to the first group server 115 being compromised. In such embodiments, the second group server identifier is a current group server identifier that is associated with the second group server 120. In alternate embodiments, the second group server 120 is new. As an example, the second group server 120 is brought on-line as a result of the first group server 115 being compromised. In such embodiments, the management server 110 may determine and distribute a group server identifier and a matching identity-based cryptographic signing key for the second group server 120.

Alternatively, when the second group server 120 is not available, the management server 110 distributes an alert signal to the communication devices 105A through 105E (at block 575). The alert signal indicates that the communication devices 105A through 105E should continue using the current group key from the compromised group server. In some embodiments, upon receiving the alert signal, a communication device may generate a visual or audible alert. As an example, upon receiving an alert signal, communication device 105A may display a visual alert on the display 225 and produce an audible alert via the speaker 220. The visual and/or audible alert may indicate that the communication device is using a potentially compromised group key and may act as a warning (for example, to the user of the communication device) to proceed with caution.

Distributing the second group server identifier, as described above, is only one example of informing the communication devices 105A through 105E which group server identifier to use. In some embodiments, the management server 110 informs the communication devices 105A through 105E which group server identifier to use without sending the actual group server identifier. As an example, the communication devices 105A through 105E may determine the second group server identifier based in part on information included in the revocation of the first group server identifier which they receive from the management server 110. As a further example, the communication devices 105A through 105E may determine the second group server identifier using pre-configured lists of backup group servers. As an additional example, the communication devices 105A through 105E may determine the second group server identifier using a versioning scheme (for example, incrementing a version number of the first group server identifier).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of revoking group server identifiers of compromised group servers, the method comprising:
   determining, with a management server, an identity-based cryptographic signing key based on a group server identifier;
   distributing, via the management server, the identity-based cryptographic signing key to a group server;
   receiving, at the management server, a security status indicating that security of the group server is compromised; and
   responsive to receiving the security status, distributing, via the management server, a revocation of the group server identifier to a plurality of communication devices.

2. The method of claim 1, wherein the group server identifier is a first group server identifier, wherein the method further comprises distributing, via the management server, a second group server identifier to the plurality of communication devices when the security of the group server is compromised.

3. The method of claim 1, further comprising performing, with the management server, a corrective action on the group server when the security of the group server is compromised.

4. The method of claim 3, further comprising distributing, via the management server, a security request to the group server after performing the corrective action.

5. The method of claim 4, wherein the group server identifier is a first group server identifier, wherein the identity-based cryptographic signing key is a first identity-based cryptographic signing key, wherein the security status is a first security status, wherein the method further comprises:
   responsive to transmitting the security request, receiving, at the management server, a second security status indicating that the security of the group server is not compromised; and
   responsive to receiving the second security status:
     determining, with the management server, a second group server identifier based on the first group server identifier,
     determining, with the management server, a second identity-based cryptographic signing key based on the second group server identifier,
     distributing, via the management server, the second identity-based cryptographic signing key to the group server, and
     distributing, via the management server, the second group server identifier to the plurality of communication devices.

6. The method of claim 4, wherein the group server is a first group server, wherein the group server identifier is a first group server identifier, wherein the security status is a first security status, wherein the method further comprises:
   responsive to transmitting the security request, receiving, at the management server, a second security status indicating that the security of the first group server is compromised; and
   responsive to receiving the second security status:
     distributing, via the management server, a second group server identifier to the plurality of communication devices,
   wherein the second group server identifier is associated with a second group server.

7. The method of claim 4, wherein the group server is a first group server, wherein the group server identifier is a first group server identifier, wherein the security status is a first security status, wherein the method further comprises:

responsive to transmitting the security request, receiving, at the management server, a second security status indicating that the security of the first group server is compromised; and responsive to receiving the second security status:
distributing, via the management server, a second group server identifier to the plurality of communication devices when a second group server is available, and distributing, via the management server, an alert signal to the plurality of communication devices when the second group server is not available.

8. The method of claim 1, further comprising:
determining, with the management server, when the security status is valid; and
distributing, via the management server, a security request to the group server when the security status is not valid.

9. The method of claim 1, wherein the group server is a first group server, wherein the method further comprises distributing, via the management server, the revocation of the group server identifier to a second group server when the security of the first group server is compromised.

10. The method of claim 1, further comprising distributing, via the management server, the group server identifier to the plurality of communication devices.

11. A management server comprising:
a transceiver; and
an electronic processor electrically coupled to the transceiver and configured to:
determine an identity-based cryptographic signing key based on a group server identifier,
distribute, via the transceiver, the identity-based cryptographic signing key to a group server,
receive, via the transceiver, a security status indicating that security of the group server is compromised, and
responsive to receiving the security status, distribute, via the transceiver, a revocation of the group server identifier to a plurality of communication devices.

12. The management server of claim 11, wherein the group server identifier is a first group server identifier, wherein the electronic processor is further configured to distribute, via the transceiver, a second group server identifier to the plurality of communication devices when the security of the group server is compromised.

13. The management server of claim 11, wherein the electronic processor is further configured to perform a corrective action on the group server when the security of the group server is compromised.

14. The management server of claim 13, wherein the electronic processor is further configured to distribute, via the transceiver, a security request to the group server after performing the corrective action.

15. The management server of claim 14, wherein the group server identifier is a first group server identifier, wherein the identity-based cryptographic signing key is a first identity-based cryptographic signing key, wherein the security status is a first security status, wherein the electronic processor is further configured to:

responsive to transmitting the security request, receive, via the transceiver, a second security status indicating that the security of the group server is not compromised, and responsive to receiving the second security status:
determine a second group server identifier based on the first group server identifier,
determine a second identity-based cryptographic signing key based on the second group server identifier,
distribute, via the transceiver, the second identity-based cryptographic signing key to the group server, and
distribute, via the transceiver, the second group server identifier to the plurality of communication devices.

16. The management server of claim 14, wherein the group server is a first group server, wherein the group server identifier is a first group server identifier, wherein the security status is a first security status, wherein the electronic processor is further configured to:
responsive to transmitting the security request, receive, via the transceiver, a second security status indicating that the security of the first group server is compromised, and
responsive to receiving the second security status, distribute, via the transceiver, a second group server identifier to the plurality of communication devices,
wherein the second group server identifier is associated with a second group server.

17. The management server of claim 14, wherein the group server is a first group server, wherein the group server identifier is a first group server identifier, wherein the security status is a first security status, wherein the electronic processor is further configured to:
responsive to transmitting the security request, receive, via the transceiver, a second security status indicating that the security of the first group server is compromised, and
responsive to receiving the second security status:
distribute, via the transceiver, a second group server identifier to the plurality of communication devices when a second group server is available, and
distribute, via the transceiver, an alert signal to the plurality of communication devices when the second group server is not available.

18. The management server of claim 11, wherein the electronic processor is further configured to:
determine when the security status is valid, and
distribute, via the transceiver, a security request to the group server when the security status is not valid.

19. The management server of claim 11, wherein the group server is a first group server, wherein the electronic processor is further configured to distribute, via the transceiver, the revocation of the group server identifier to a second group server when the security of the first group server is compromised.

20. The management server of claim 11, wherein the electronic processor is further configured to distribute, via the transceiver, the group server identifier to the plurality of communication devices.

* * * * *